UNITED STATES PATENT OFFICE.

GASTON PHILIPPE GUIGNARD, OF MELUN, AND HENRI LOUIS ADOLPHE MARIE WATRIGANT, OF LILLE, FRANCE.

EXTRACTION OF GLYCERIN AND FATTY MATTERS CONTAINED IN DISTILLERY-VINASSES.

1,092,791.  Specification of Letters Patent.  Patented Apr. 7, 1914.

No Drawing.  Application filed May 29, 1911. Serial No. 630,203.

*To all whom it may concern:*

Be it known that we, GASTON PHILIPPE GUIGNARD, a citizen of the Republic of France, and a resident of Avenue des Marronniers, Melun, Seine-et-Marne, France, and HENRI LOUIS ADOLPHE MARIE WATRIGANT, a citizen of the Republic of France, and a resident of 48 Façade de l'Esplanade, Lille, Nord, France, have invented a new and useful Process for the Extraction of Glycerin and Fatty Matters Contained in Distillery-Vinasses, of which the following is a specification.

The invention has for object the simultaneous extraction of the glycerin and the fatty matters and in some cases of the betain contained in distillery vinasses, and consists in submitting them to a total desiccation followed by lye-washing by means of a mixture of anhydrous ethyl alcohol with addition of acetone, and carbon tetrachlorid or other solvent of fatty matters soluble in alcohol. The total desiccation has for object to prevent hydration of the anhydrous ethyl alcohol and thereby to avoid solution by the solvent of bodies soluble in aqueous alcohol.

In practice it is advisable first to separate the organic acids (succinic, tartaric, citric, etc.,) contained in the vinasses by precipitating them with a suitable re-agent such as ferric hydrate, lime, baryta, etc. These organic acids are separated from one another as hereafter described.

The following description indicates two examples of the application of the invention, one to grain-vinasses and the other to beet-vinasses and molasses.

Grain-vinasses are treated as follows: To the vinasses leaving the distilling column there is added zinc oxid, ferric hydrate, lime or baryta, and if desired a mixture of these two bases; the excess is saturated with carbon dioxid from the vats. A precipitate of zinc lactate, ferric succinate, calcium or barium carbonate is produced. This precipitate may serve for the extraction either of lactic acid or of succinic acid. The filtered vinasse is taken to a regenerative evaporator and then to a drying apparatus such as is described in our application filed May 27, 1911, Serial No. 629,837. This apparatus is designed to dry the vinasse completely. The dried vinasse leaves a residue called dry malt, from which the fats and glycerin are extracted by washing preferably in an extractor, with anhydrous ethyl alcohol and acetone, or anhydrous ethyl alcohol and carbon tetrachlorid, or a mixture of the three solvents. The solvent liquid removes the fats and the glycerin; the insoluble portion consisting of nitrogenous matter, cellulose, etc., may be used for feeding cattle. The solvent is recovered by distillation leaving a syrupy liquid upon which the fats float: the two parts are separated by decantation yielding fat and glycerin.

The glycerin is purified in either of the following ways: (1) by distillation *in vacuo* at 179–180°. (2) by passing this glycerin through the above mentioned drying apparatus heated below 100° and *in vacuo;* the residue leaving the apparatus is finally treated with the mixture of alcohol and carbon tetrachlorid. Pure glycerin is recovered by evaporation.

The process for the treatment of molasses and beet-vinasses is the same as that for grain-vinasses up to the treatment with the mixture of said solvent liquids inclusive. The washing of these liquids in the extractor yields: (1) a solution containing glycerin and betain. (2) an insoluble portion comprising sodium and potassium carbonates, etc., and various non-nitrogenous organic substances. The separation of the glycerin and betain is effected by evaporating the solvent; the residue when completely dried is treated again with carbon tetrachlorid alone which dissolves only the betain. The residue is glycerin which is purified as above described. The part insoluble in the solvent is dissolved in the minimum quantity of water and saturated with carbon dioxid. The sodium and potassium salts yield insoluble bicarbonates which are separated by filtration. The mother liquors of this treatment serve for the solution of the part insoluble in alcohol in the following operation.

Having thus described our invention, what we claim as such and desire to secure by Letters Patent is:—

1. The simultaneous extraction of glycerin and fatty matters contained in distillery-vinasses, characterized by the total drying of the vinasses, followed by washing by means of a mixture of anhydrous ethyl alcohol and a solvent of the fatty matters soluble in alcohol.

2. A process for the simultaneous extraction of glycerin and fatty matters from vinasses, comprising the separation of organic acids by precipitation with a suitable base, the filtration and evaporation to dryness of the vinasses, the extraction of the dried residue with anhydrous ethyl alcohol mixed with a solvent soluble therein, the removal by distillation of the mixed solvent, the separation of the remaining glycerin and fat by decantation, and the purification of the glycerin.

In testimony whereof we have signed our names to this specification, in the presence of two subscribing witnesses.

GASTON PHILIPPE GUIGNARD.
HENRI LOUIS ADOLPHE MARIE WATRIGANT.

Witnesses:
DEAN B. MASON,
LEON PEILLES.